W. WELSH & W. PURVIS.
RESILIENT WHEEL.
APPLICATION FILED MAY 12, 1910.

964,351.

Patented July 12, 1910.

Witnesses
B. B. Collings.

Inventors
W. Welsh and W. Purvis
his Attorneys

UNITED STATES PATENT OFFICE.

WILLIAM WELSH AND WILLIAM PURVIS, OF GLASGOW, SCOTLAND.

RESILIENT WHEEL.

964,351.  Specification of Letters Patent.  Patented July 12, 1910.

Application filed May 12, 1910. Serial No. 560,872.

*To all whom it may concern:*

Be it known that we, WILLIAM WELSH and WILLIAM PURVIS, subjects of the British King, residing at Glasgow, Scotland, have invented certain new and useful Improvements in Resilient Wheels; and we do hereby declare the following to be a full, clear, and exact description of the invention, such as will enable others skilled in the art to which it appertains to make and use the same.

This invention relates to resilient wheels of the type wherein the rim of the wheel is made up from a number of sections movably jointed together and supported on the nave of the wheel by means of spring spokes and the invention has for its object to improve the construction of such wheels.

Under the present invention each rim section has secured thereto spoke members or pins which are capable of being readily adjusted in such manner as to vary the compression of the springs in the spokes and the rim sections of the wheel are secured together by means of improved jointing arrangements.

In order that the invention may be clearly understood we have hereunto appended explanatory drawings whereon—

Figure 1:
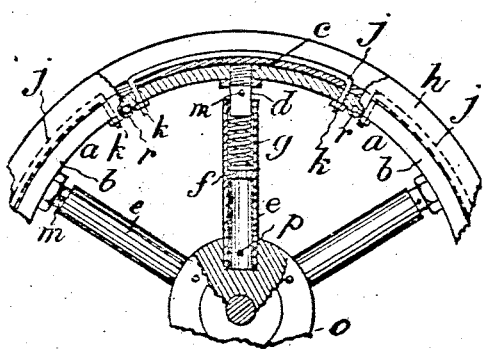
Figure 2:
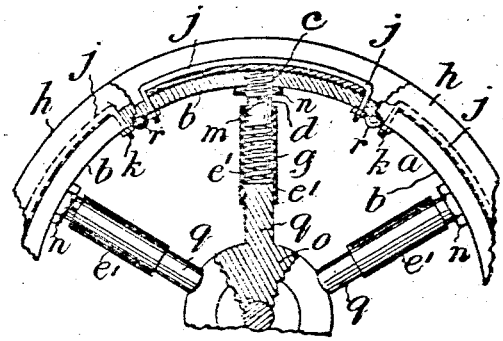
Figure 3:
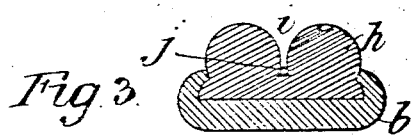
Figure 4:
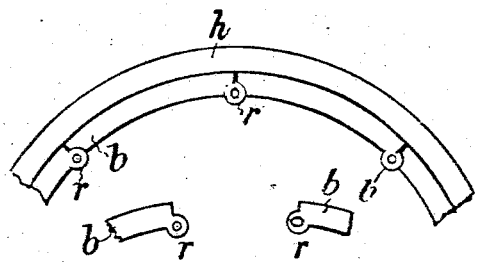

Figure 1 shows a part of the wheel partly in section and partly in side elevation. Fig. 2 shows a slightly different construction of the wheel. Fig. 3 is a cross section of the rim and tire. Fig. 4 shows a method of hinging the rim sections together.

In carrying out our invention the felly or rim $a$ of the wheel is made in segments provided with screwed sockets $c$ which point radially toward the center of the wheel and which are each adapted to receive the screwed end of a pin $d$. Each of the pins $d$ when screwed into place projects radially toward the center of the wheel. Each spoke $e$ of the wheel is made with a socket at its outer end and into this socket a spring $g$ is inserted and the pin projecting radially from the underside of the felly or rim, is adapted to enter the socket and bear on the top of the spring therein the lower end of the spring bearing on a stop $f$ in the socket. The spokes may be tubular as shown at Fig. 1, and open at their outer ends for the reception of the pins which latter are each partly threaded and partly smooth, the smooth part of each pin working freely in its tubular spoke.

The tire $h$ may be formed as a continuous ring of rubber or other material and is preferably made with a central trough or groove $i$ into which wires $j$ or the like are fitted each wire $j$ being a little longer than a segment of the rim and the ends thereof being passed through holes in the tire and the segment, and secured at the inside of the rim by means of nuts $k$. In this manner the tire is tightly secured to each segment by a wire.

Each pin $d$ is screwed securely into the rim while its smooth end works freely in the tubular spoke. The pressure put on the spring can be increased or diminished by screwing the pin more or less out of the rim and thereby forcing the smooth end more or less into the spoke. To facilitate the turning of the pin it is provided with tommy holes $m$. When the pin is adjusted it is jammed tight by a screw nut $n$.

The tubular spokes can be secured in sockets in the nave $o$ by means of pins $p$.

As shown at Fig. 2 instead of having tubular spokes $e$ the nave may be cast with solid spokes $q$ upon each of which a tubular piece $e'$ is driven or screwed this tubular piece forming a socket for the pin to work in.

The segments of the rim may be connected together in various ways such as by means of hinges $r$ as shown at Fig. 4. In this case the leaf of the hinge of one segment works loosely on the hinge pin so as to give a small amount of circumferential play.

We claim:—

A resilient wheel, comprising a rim made in segments jointed together, a radial pin adjustably secured to the center of each segment, a hub provided with hollow spokes, one for each pin, a spring in each spoke between said pin and the hub of the wheel, a tire encircling said rim, and wires one for each segment, passing around part of the tire and passing through each segment and secured on the inside thereof, substantially as described.

In testimony whereof, we affix our signatures, in presence of two witnesses.

WM. WELSH.
WILLIAM PURVIS.

Witnesses:
I. H. PEARSON,
JAS. McCONECHY.